United States Patent [19]

Purstinger et al.

[11] Patent Number: 5,186,876
[45] Date of Patent: Feb. 16, 1993

[54] PROCESS OF MAKING DIMENSIONALLY STABLE SECTION

[75] Inventors: Franz Purstinger, Bad Hall; Frank Dorninger, Micheldorf, both of Austria

[73] Assignee: Schaumstoffwerk Greiner Gesellschaft m.b.H, Kremsmunster, Austria

[21] Appl. No.: 814,233

[22] Filed: Dec. 23, 1991

Related U.S. Application Data

[63] Continuation of Ser. No. 472,215, Jan. 29, 1990, abandoned, which is a continuation-in-part of Ser. No. 415,125, Sep. 29, 1989, abandoned.

[30] Foreign Application Priority Data

Jan. 27, 1989 [AT] Austria .................................. 157/89
Jul. 5, 1989 [AT] Austria ................................ 1642/89

[51] Int. Cl.$^5$ ..................... B29C 47/04; B29C 47/92; B29C 65/02; B32B 31/30
[52] U.S. Cl. ................................... 264/40.6; 156/64; 156/244.15; 156/244.23; 156/244.25; 156/309.9; 156/324; 264/171; 264/173; 264/177.19; 264/209.3; 264/211.12; 264/234; 264/237

[58] Field of Search .................. 264/40.6, 171, 173, 264/177.1, 177.17, 177.19, 178 R, 209.1, 209.3, 211.12, 234, 237, 248, 345, 348; 156/64, 244.11, 244.13, 244.15, 244.23, 244.25, 308.2, 309.9, 322, 324

[56] References Cited

U.S. PATENT DOCUMENTS

| | | | |
|---|---|---|---|
| 3,741,857 | 6/1973 | Kakutani et al. | 156/244.23 X |
| 4,481,058 | 11/1984 | Park | 156/244.23 X |
| 4,555,282 | 11/1985 | Yano | 156/244.23 X |
| 4,929,408 | 5/1990 | Lodder et al. | 264/173 X |

FOREIGN PATENT DOCUMENTS 159307 10/1985 European Pat. Off. .

Primary Examiner—Leo B. Tentoni
Attorney, Agent, or Firm—Collard & Roe

[57] ABSTRACT

A dimensionally stable plastics section, for example a window section, formed from a plastics extrudate and being provided thereon with an extruded layer, for example a sealing or damping device or a protective strip, is manufactured by extruding the section, calibrating it, and cooling it to ensure its dimensional stability, heating part of the surface of the section, to which the layer is to be applied, extruding the layer onto the heated part of the surface of the section so that the extruded layer is bonded thereto and using a take-up device to grip the finished section to remove it.

17 Claims, 10 Drawing Sheets

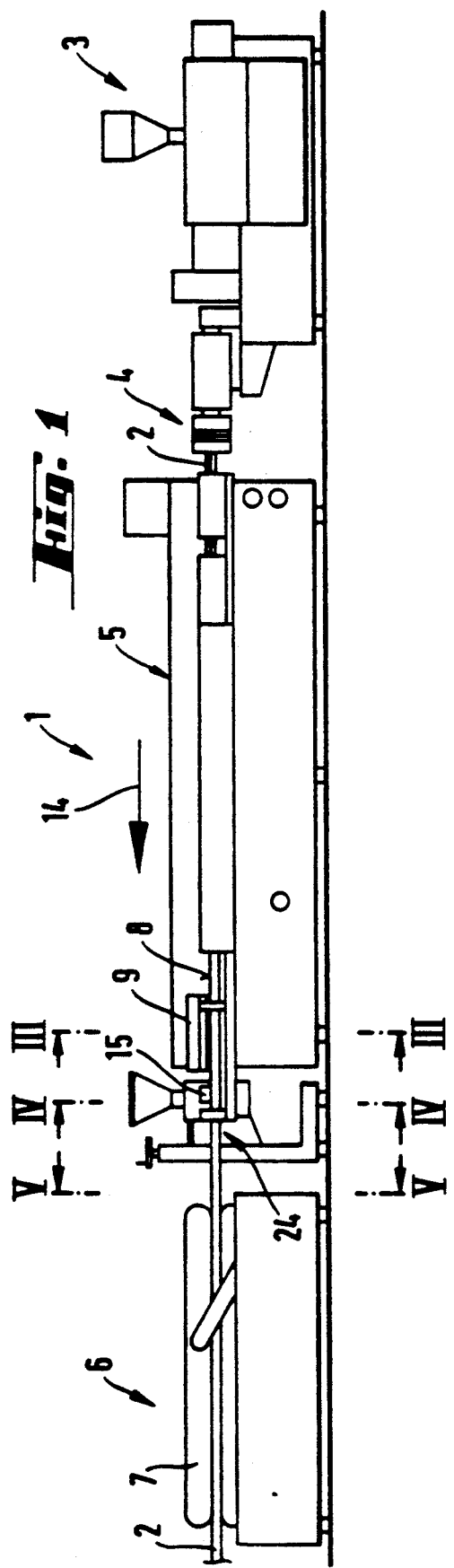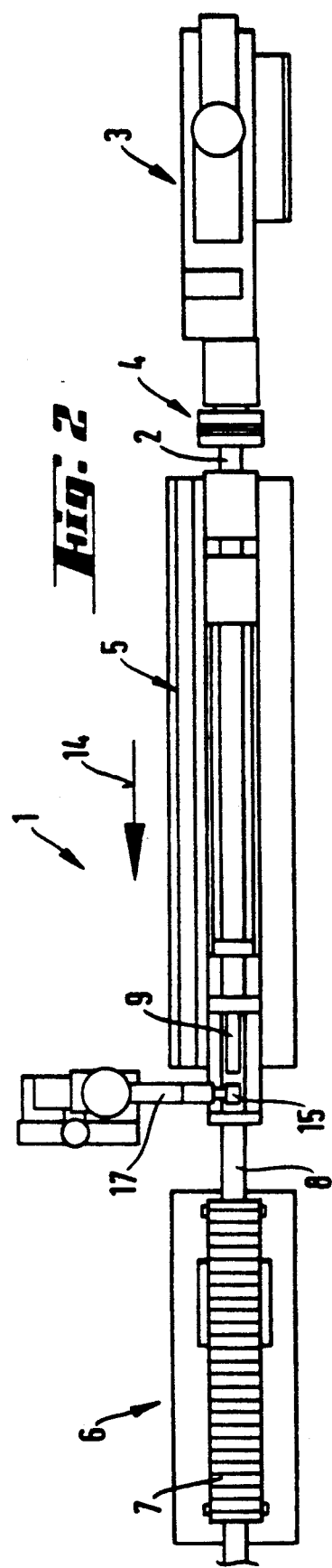

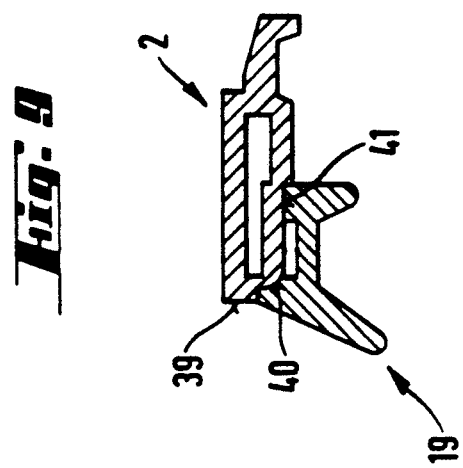
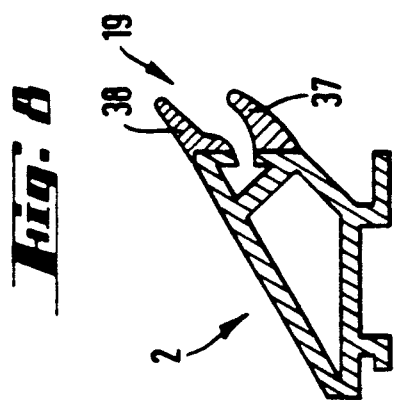
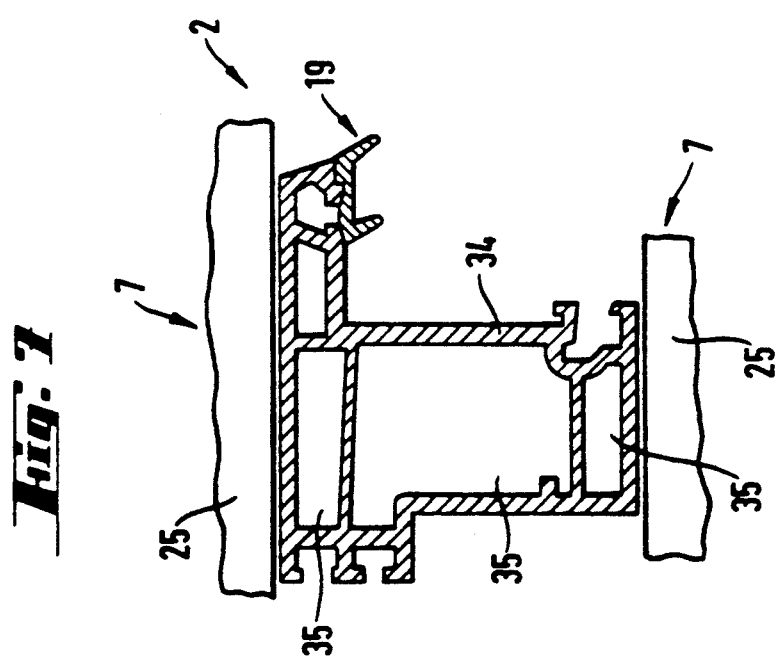

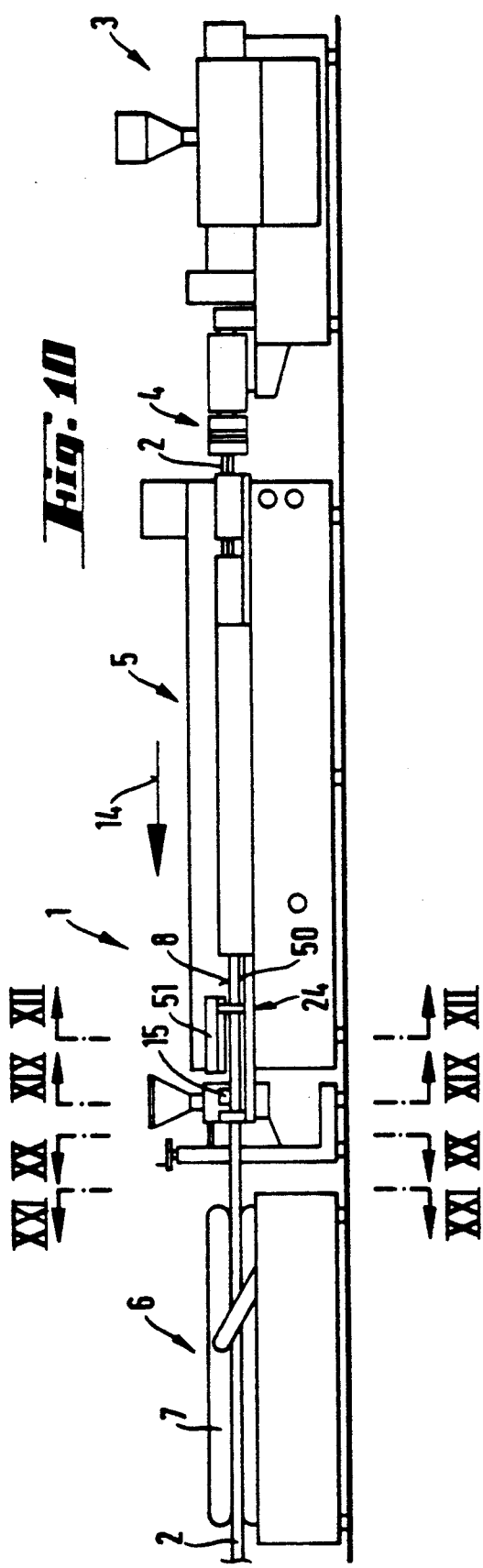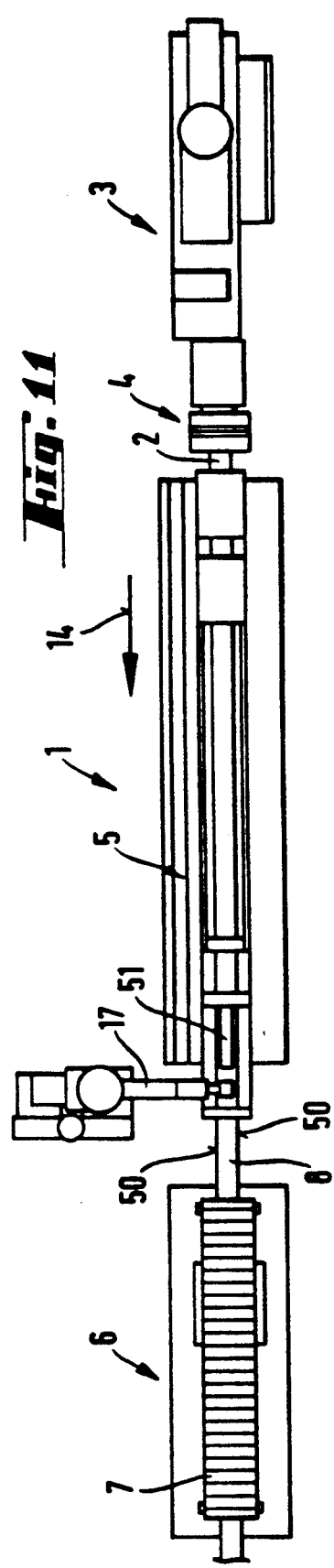

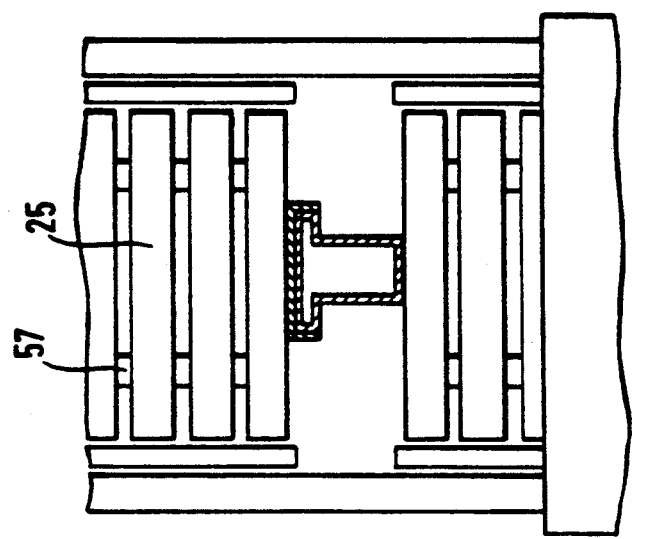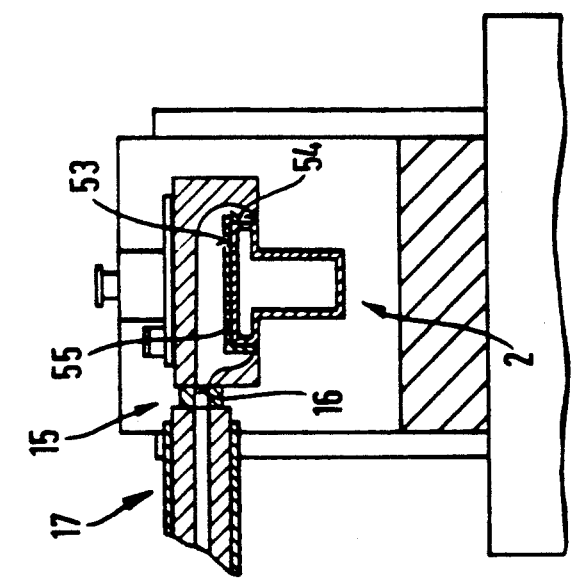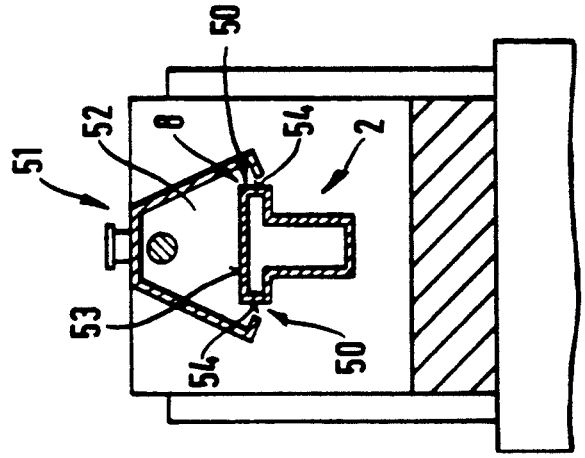

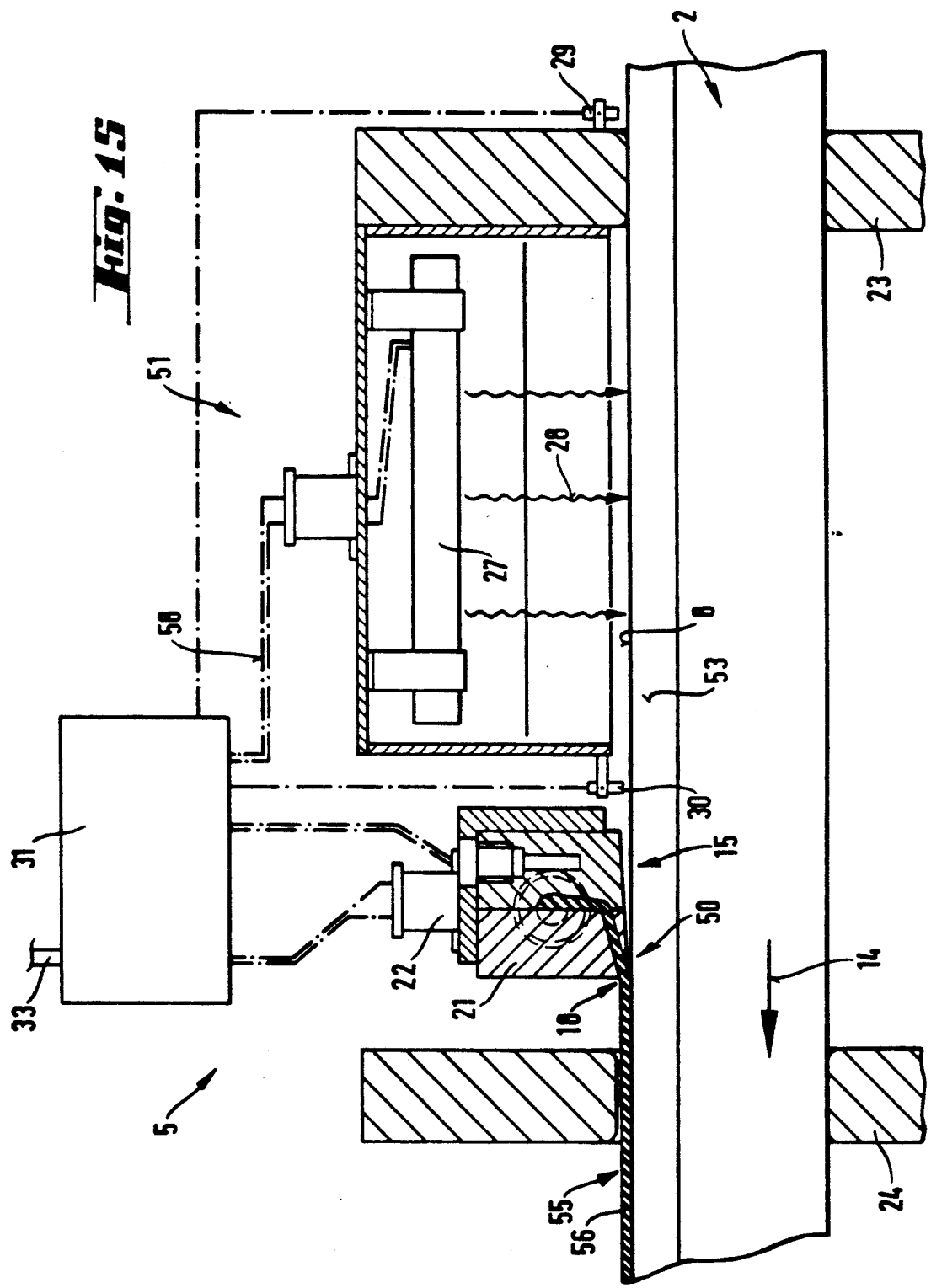

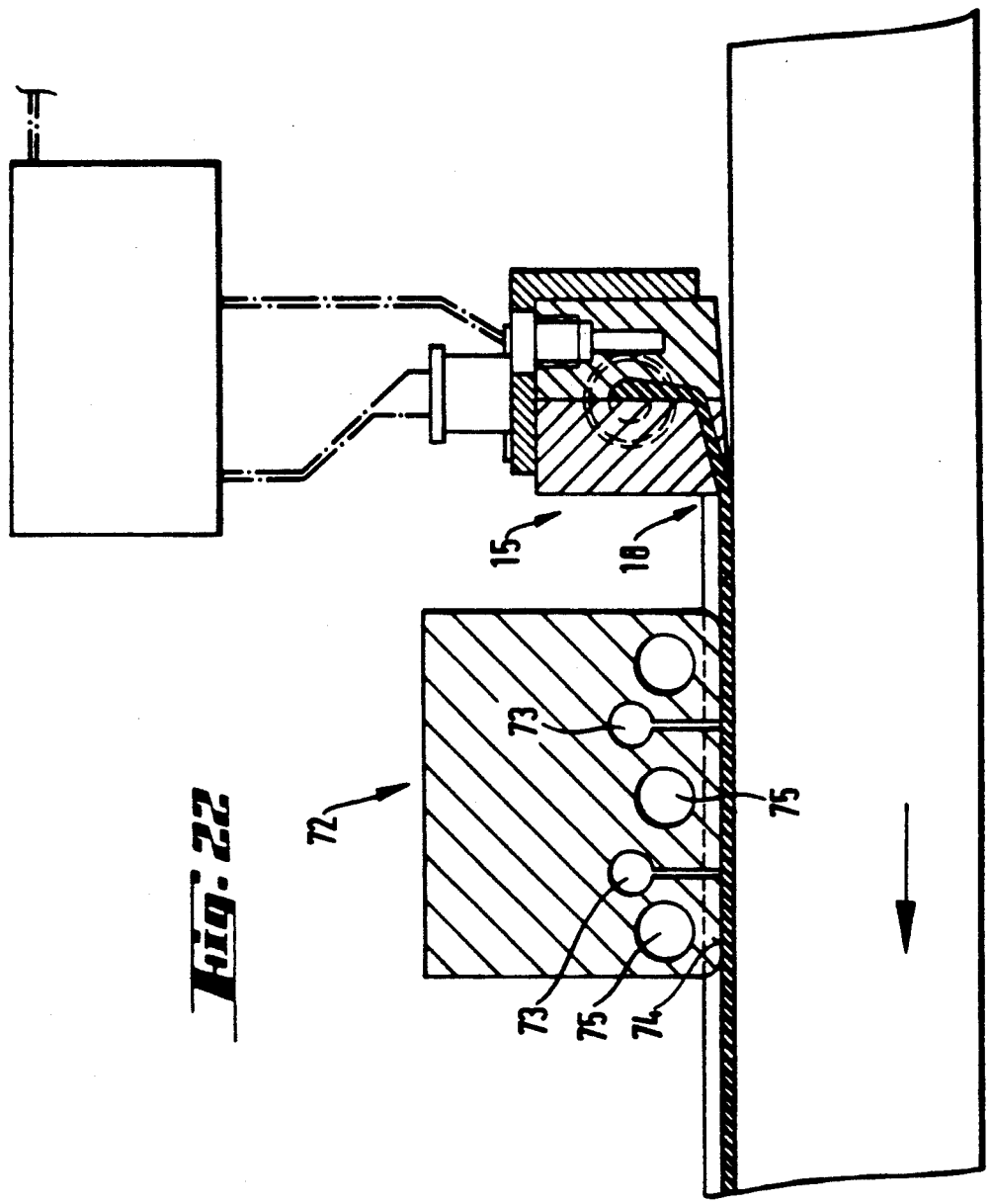

PROCESS OF MAKING DIMENSIONALLY STABLE SECTION

CROSS-REFERENCE TO RELATED APPLICATIONS

This is a continuation of copending application Ser. No. 472,215, filed Jan. 29, 1990, now abandoned, which is a continuation-in-part of application Ser. No. 415,125, filed Sep. 29, 1989, now abandoned.

FIELD OF THE INVENTION

The invention relates to a process and a machine for the production of a dimensionally stable section, for example a window section, formed from a plastics extrudate and being provided thereon with an elastically deformable layer having a higher modulus of elasticity than said section, the section and the layer being extruded in the same operation. Said layer may be, for example, a protective layer, or a device for sealing or damping, or for covering parts of said section. The invention also relates to the product of the method.

BACKGROUND OF THE INVENTION

In manufacturing dimensionally stable sections, in particular hollow window sections, it is desirable, when producing the sections, simultaneously to mould on said layers, in order to avoid subsequent cementing operations and aftertreatments. It has been attempted to produce such dimensionally stable hollow sections with said layers in a single operation by co-extrusion. To this end protective layers or devices or the sealing and/or damping devices were extruded directly in the extrusion nozzle region, after finally forming a dimensionally stable section, through additional nozzle channels in the region of the nozzle lip. These nozzle channels were connected to a further extruder for a plastics material which, after cooling, was soft and capable of elastic deformation. Simutaneous extrusion of the protective layers or devices, however, impedes the calibration of the dimensionally stable hollow sections and, thus increases the production costs.

EP-A-159 307 concerns the application to a tubular hollow section, for example a cable conduit, of an electrically conductive wire or a tape. The wire or the conductive tape is, however, produced in a separate operation, prior to being applied to the cable conduit. It has been proposed to heat said wire or the tape after the hollow section or cable conduit has cooled to a temperature of 50° C., that is to say to a dimensionally stable state in that region in which the wire or tape is to be attached to the periphery of the cable conduit. The wire or the tape which is to be applied is heated by means of a heat source and pressed, by means of a pressure device which may, if required, be heated, onto the surface of the cable conduit which is moved past the pressure device in the direction of extrusion. After the application of the wire or the tape, the entire section is gripped by a crawler-type take-up for removing the extruded cable conduit. The connection between the electrically conductive wire or tape and the cable conduit is achieved by intensive heating, for example by means of gas flames or a beam of infra-red light or similar means so that, when said wire or tape is pressed under high pressure it is embedded, by virtue of local melting of the thermoplastic material of the hollow section or cable conduit, into the latter and, after cooling is fritted into the wall of the hollow section or conduit. Since in certain cases the thermal capacity of the wire is insufficient adequately to bring about embedding or fritting in position, of the wire, it has already been proposed to heat the hollow section or cable conduit in that region, where the wire or tape is to be worked in. Additionally the tubular section or the tape or the wire can be coated with a heat-responsive adhesive so that the wire or tape is not only embedded and fused in position but is also cemented to the tubular section.

SUMMARY OF THE INVENTION

The present invention is, according to one aspect thereof, intended to provide a process for producing dimensionally stable sections formed from plastic extrudates, by means of which process a protective layer and/or device or a sealing and/or damping device which may more briefly be referred to simply as a "layer produced by extrusion", can be applied in a single operation and subject to perfect calibration of the hollow section.

To this end, according to the invention, a process for the production of a dimensionally stable section formed from a plastics extrudate and being provided thereon with a layer produced by extrusion, comprises the steps of: forming said section by extrusion through a nozzle; calibrating said section upon its emergence from said nozzle and cooling said section to an extent to render it dimensionally stable; heating a region of a surface of said section to which said layer is to be applied, to bring said surface region at least to a plastic condition; extruding said layer onto said heated region to apply said layer thereto; and gripping said section by means of a take-up device for removing it.

An advantage of this solution is that curing and forming of the dimensionally stable section and hence its dimensional stability can be precisely maintained, which is extremely important, especially when producing window sections. At the same time, however, the application, in the same operation, of the said layer, is still enabled. Surprisingly, a sufficiently good bond can be achieved between the surface region of said section and said layer, since, by virtue of surface roughness produced in the course of calibration, as well as superficial melting of the surface region and the associated fusion between the extruded plasticised plastics material for said layer, there is achieved a hard-wearing, permanent bond. The need for costly after-treatment of said section by grinding, or the application of a primary layer before application of the layer produced by extrusion to an already completed section, is thereby avoided.

Said section, as it emerges from the calibrating or cooling zone and preferably also prior to its entry into the take-up device is preferably guided both lateral and vertically, for exact positioning of said section when the layer produced by extrusion is applied.

In addition, said section, may be heated at least over the surface region to which the said layer produced by extrusion is to be fused, to an extent to melt it superficially, whereby the plastic extrudate constituting said layer is fused with said surface region.

The temperature of said section is preferably measured before its entry into the heating zone in order to determine, as a function of such measurement, the amount of heat needed for heating said section in said region thereof since excessively deep superficial melting of said surface region is thereby avoided, it being also ensured that said superficial melting is sufficient for fusion with the material of said layer.

Further, the temperature of the plastic material in the heated surface region of said section may be measured, while, as a function of such measurement, reducing the heat supplied for heating said region if a predetermined temperature is exceeded and increasing such heat if the predetermined temperature is not reached. Independent monitoring and control of the amount of heat supplied and the temperature achieved in the heated surface region of said section can thereby be precisely controlled.

The temperature of said section may, however, be measured before it reaches the heating zone and the temperature of said heated surface region measured after its heating, the heat energy supplied being a function of the two measured temperatures whereby changes in temperature can be identified at an early stage thus enabling sensitive temperature control.

After its calibration, the said section may be cooled to a temperature of less than 70° C. and the part of the surface region of said section, to which the said layer is to be applied, heated to not less than 150° C., whereupon a plastics material for constituting the said layer is extruded on to said surface region. Undesirable accumulation of stresses in the calibrated section is thereby avoided. Preliminary calibration of said dimensionally stable section produces a certain surface roughness enabling a good bond between the layer produced by extrusion and said section.

A plasticised plastics melt may be fused, in order to form said layer, with the plasticised part of said region of the surface of said section, to provide an intimate, positive bond.

After its calibration, said section may be guided laterally and/or vertically, preferably before and after the application of the said layer, in order to achieve perfect control and hence adequate dimensional stability of said section directly within the region to which said layer is applied.

Said section may be gripped by the take-up device at positions adjacent to said layer in order to prevent disturbance or undesired deformation thereof.

Said layer may, however, be cooled proximate to the take-up device, in order to enhance the resistance of said layer to undesired deformation.

The layer produced by extrusion may be introduced, as a protective layer, into a recess between two opposite side edges of said section and connected to said side edges, in order to provide flush closing or shutting off of the recess and to facilitate removal of the protective layer, owing to the fused regions between the end faces of the recess and the protective layer and the resultant brittleness.

The protective layer may project beyond two opposite end faces of the recess within the region of the outer faces of said section, in order to reduce sinking or sagging of the protective layer, inwardly of the recess.

The layer produced by extrusion may be in the form of a covering device for a recess in said section, being extruded on to the outer faces of said section so as to span them, to provide a resistant cover over said recess.

According to another aspect of the invention, in a dimensionally stable section produced by a method according to the invention said layer produced by extrusion is fused to a calibrated part of the surface of said section or fused between such surfaces. In this case, said layer may be applied to a surface of a dimensionally stable hollow window section which has already been calibrated in a dimensionally stable manner, so that, when a window is assembled from such sections, precise sealing and improved strength of said hollow section is achieved. By evenly cooling the hollow section immediately after its calibration, stress zones are avoided. These may occur if, owing to greatly differing wall thicknesses or volumetric masses, cooling takes place at different rates.

The layer produced by extrusion may be fused over its entire surface to the heated surface region of said section, so as to achieve intimate area bonding therewith and a secure and resistant grip on said section.

The said layer may be extruded onto the plasticised surface region of said section, for improved anchoring of said layer.

Said section may be provided with a plurality of layers produced by extrusion, spaced along its periphery and being arranged independently of one another. Such an embodiment can be achieved only by precooling said section until it achieves a dimensionally stable state, thus avoiding deformation and distortion of said section, use being made of tools of simple design which are, therefore, operationally reliable.

According to a further aspect of the invention a machine for the production of dimensionally stable sections formed from a plastics extrudate and being provided thereon with a layer produced by extrusion comprises: a frame; a first extrusion device on the frame for extruding said section in a downstream direction; a first nozzle on the frame located downstream of the extrusion device, for forming said section; a calibrating and cooling device on the frame, located downstream of said nozzle, for calibrating and cooling said section; a take-up device on the frame, located downstream of the calibrating and cooling device, for removing said section; a second nozzle on said frame located between the calibrating and cooling device and the take-up device and having a nozzle opening for forming said layer produced by extrusion and being positioned for contact with said section as it passes in said downstream direction; and a second extrusion device connected to said second nozzle for extruding said layer. Further cooling of said section can be effected downstream of the calibrating and cooling device and upstream of the take-up device, whereas such region of the machine can be used for the application of said layer whereby rapid adaptation to differently shaped dimensionally stable sections can be achieved if only one nozzle opening in contact with the surface of said section is provided.

The take-up device, in particular with crawler-type take-up is preferably provided with recesses for receiving said layer in order to avoid undesired permanent deformation of said layer without the need for the take-up device to be specially constructed to this end.

The said layer may, however, be arranged on faces of said section which are inclined or are offset with respect to transport faces of the crawler tracks, thereby avoiding the need for any modification of the take-up device.

A heating device associated with a surface region of said section may be arranged between the cooling and calibrating device and the nozzle of said second extrusion device, thus enabling an even temperature of the surface region of said section to be achieved when extruding said layer onto said section, thus providing an exactly defined, good bond between these parts.

As another expedient the heated surface region may have a width corresponding approximately to the width of said layer so that the surface shape and quality of said section is not disadvantageously modified, in particular for reasons of good design in the regions adjacent to said strip.

A further calibrating device and, if required, a further cooling device may be arranged downstream of the nozzle of the second extrusion device, for controlled cooling and exact shaping of said layer. This nozzle may have at least two nozzle openings spaced peripherally of said section, to enable several of said layers, for example several sealing lips distributed about the periphery of said section, to be provided.

BRIEF DESCRIPTION OF THE DRAWINGS

FIG. 1 is a diagrammatic side view of a machine according to a first embodiment of the invention, for the production of dimensionally stable sections from a plastic extrudate;

FIG. 2 is a top plan view of the machine;

FIG. 7 is an end view of a first embodiment of an extruded plastics section in association with track plates of said take-up which are shown diagrammatically;

FIG. 8 is an end view of a second embodiment of an extruded plastics section with sealing or damping devices moulded thereonto;

FIG. 9 is an end view of a third embodiment of an extruded plastics section with a sealing or damping device mounted thereon;

FIG. 10 is a diagrammatic side view of a machine in accordance with a second embodiment of the invention, for the production of dimensionally stable sections from a plastic extrudate;

FIG. 11 is a top plan view of the machine of FIG. 10;

FIG. 12 is a view taken on the lines XII—XII in FIG. 10;

FIG. 13 is a view taken on the lines XIII—XIII in FIG. 10;

FIG. 14 is a view taken on the lines XIV—XIV in FIG. 10;

FIG. 15 is a fragmentary longitudinal sectional view of the machine of FIG. 10 in the region of a nozzle arranged between a cooling and calibrating device thereof and a crawler-type take-up and a heating device upstream of said nozzle;

FIG. 22 is a fragmentary longitudinal sectional view of said modified machine, in the region of a nozzle arranged between a cooling and calibrating device and a crawler-type take-up and of a heating device of FIGS. 19 to 21.

DETAILED DESCRIPTION OF THE INVENTION

Figure 5:
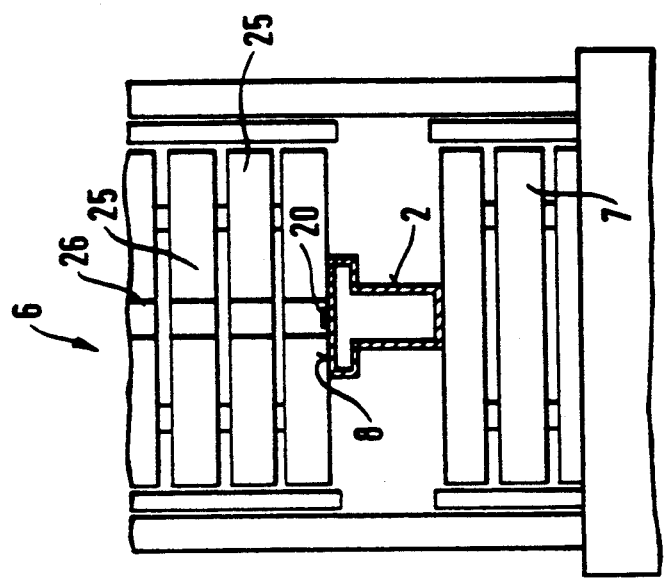
FIG. 5 is a view taken on the lines V—V in FIG. 1.

In the following description like reference numerals identify like integers.

Figure 3:
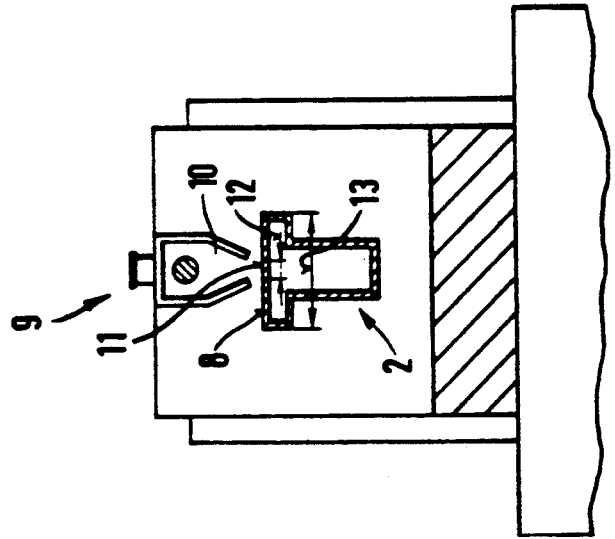
FIG. 3 is a view taken on the lines III—III in FIG. 1.

FIGS. 1 to 6 show a machine 1 for producing dimensionally stable sections 2 from plastic extrudates, in particular window sections, which are generally hollow. This machine comprises an extrusion device 3, a nozzle 4 downstream thereof and a cooling and calibrating device 5. Downstream of the device 5 is a take-up device 6, for example with crawler-type take-ups 7. A heater 9 is associated with one side face 8 of said section 2. As shown in FIG. 3, the heater 9 may be a hot-air blower 10, by means of which a surface layer 11 of said section 2 having a width 12 smaller than the overall width 13 of the section 2 is heated to an extent to bring it to a doughy or plastic state. To this end, the surface layer 11 is heated to a temperature of at least 150° C. The section 2, having emerged from the cooling and calibrating device 5 directly upstream of the heating device 9, has a temperature of less than 70° C., and has therefore cooled down to such an extent as to be dimensionally stable, there being virtually no likelihood of further changes in its outer dimensions. As a result, no undesirable stresses can accumulate in the section 2 by virtue of pressure acting unilaterally on the section 2 or heat applied to narrow regions thereof and the section 2 cannot undergo subsequent undesirable deformation.

Figure 4:
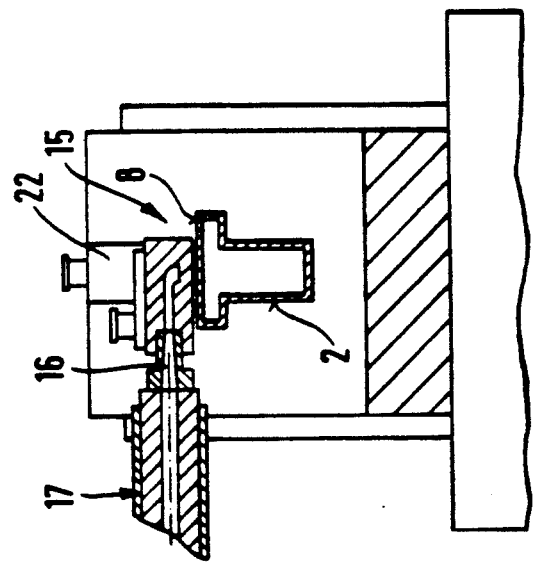
FIG. 4 is a view taken on the lines IV—IV in FIG. 1.
Figure 6:
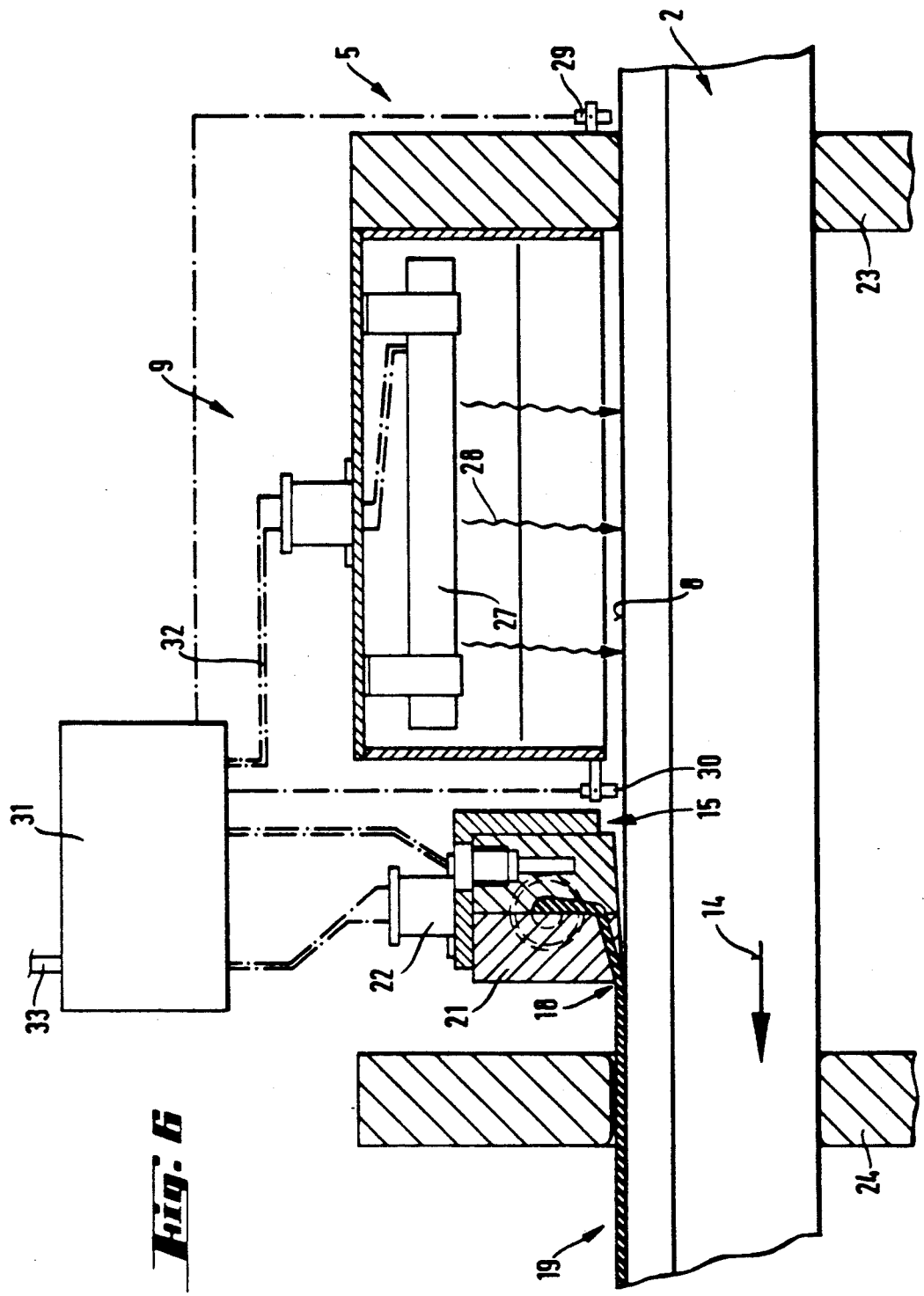
FIG. 6 is a fragmentary longitudinal sectional view of the machine in the region of a nozzle between a cooling and calibrating device thereof and a crawler-type take-up and a heating device upstream of said nozzle.

The heater 9 is associated, in the direction of extrusion, that is to say in the direction of the arrow 14 in FIGS. 1 and 2, with a nozzle 15, which, as best seen in FIGS. 4 and 6, contacts said side face 8 of the section 2. The nozzle 15 is connected to an outlet 16 of a further extrusion device 17 and comprises a nozzle opening 18, the cross-section of which corresponds to the cross-section of a sealing or damping device 19. The device 19 consists, in the present embodiment of a resilient sealing strip 20 formed, for example, from a plastic material having a high modulus of elasticity and being capable of elastic deformation even after cooling, so that it is deformable under appropriate pressure to bring about tight sealing between abutting sections.

The modulus of elasticity of the plastics material of the device 19, which may be both a sealing and a damping device, is greater than that of the section 2. A sealed joint can thereby be made between the abutting surfaces of the harder section 2 and the softer device 19. It is also assured that the section 2 remains stable during the deformation of the device 19, the section 2 not being deformed at all. The device 19 is preferably made of polyether foam, or open-celled or sealed-celled soft polyurethane foam, or a composition of plastics material and rubber.

As will be apparent from FIGS. 4 and 6, a nozzle body 21 of the nozzle 15 is pressed, by means of a pressure drive 22 against said side face 8 of the section 2. The section 2 cannot be displaced even under the force exerted by the drive 22, as the section 2 is guided or supported in a former 23 at the outlet of the cooling and calibrating device 5 as well as in a former 24, before entering the take-up device 6, downstream thereof. As best seen in FIG. 3, the guiding and supporting action of the formers 23 and 24 is effected both laterally and vertically. In addition, the section 2 is subject to great tension, under the tensile force exerted by the take-up device 6 and the former 23 in the cooling and calibrating device 5, so that for this reason also it cannot be displaced by the pressure exerted by pressure drive 22.

Also, as shown in FIG. 5, track plates 25 have recesses 26, the cross-section of which correspond substantially to the cross-section of the sealing strip 20 of sealing or damping device 19. This prevents destruction or undesirable deformation thereof immediately after it has been formed by virtue of the pressure exerted by the take-up device 6 or crawler-type take-up 7.

As shown in FIG. 6, the heater 9 may comprise a heating element 27, for example an infra-red heating element, heated by means of gas or, electric current so as to apply sufficient thermal energy, as indicated diagrammatically by arrows 28, to heat said surface layer 11, to more than 150° C. a temperature at which superficial melting of the plastics material occurs.

For monitoring changes in temperature, in particular of the section 2 prior to its entry into the heater 9, a transducer 29, can be provided, for example in the region of the former 23 of the cooling and calibrating device 5. Similarly, a transducer 30 may be arranged between the heater 9 and the nozzle 15, to enable the temperature in the region of the surface layer 11 to be determined. The transducers 29 and 30 may be connected to a control unit 31, linked, by way of supply and control lines 32, to the heater 9 and by a line 33 to an energy supply system, for example electric mains or a gas network.

The transfer of thermal energy to surface layer 11, which is indicated by said arrows 28, can thus be regulated in accordance with the value measured by the transducer 30, that is to say the temperature in the region of the surface layer 11. The values measured by transducer 29 may, however, be incorporated into the regulating operation so that temperature fluctuations in the section 2 entering the heater 9 can be taken into account automatically, thus enabling variations in the temperature of said surface layer 11 in the region of nozzle 15 to be mainly avoided, in which case the transducer 30 has merely a safety function.

Advantageously, the side face 8 of the section 2 is heated in the region of surface layer 11, only over a width 12, to which the sealing or damping device is applied, so that the surface quality of the regions adjacent to the sealing or damping device 19 are not unfavourably affected. If required, however, and if the quality of the section 2 is not impaired the entire side face 8 can be heated.

FIG. 7 shows a first embodiment of the section 2, which can be produced using a machine according to the invention. FIG. 7 shows a finished hollow section part 34, for example for a window, which is provided with several compartments 35. In addition, surface projections and locking strips are provided for snap-connection with other sections. There are shown diagrammatically in FIG. 7, the track plates 25 of the crawler-type take-ups 7 by means of which section 2 is pulled from the cooling and calibrating device 5. FIG. 7 also shows that the sealing or damping device 19 is arranged on a side face of the section, facing away from a side face 36 which faces a plate 25 of the take-ups 7. The removal of the section 2 by means of the take-ups 7 is accordingly not impeded, and the sealing or damping device 19 is not damaged by the crawler-type take-ups 7 acting upon the section directly downstream of the nozzle 15, so that it can cool slowly in the form in which it was produced.

FIG. 8 shows a second embodiment of the section 2, which can be produced by means of the machine shown in FIGS. 1 to 6.

FIG. 8 shows that the sealing or damping device 19 may be provided with two sealing lips 37 and 38 distributed over its cross-section and being spaced from one another. The lips 37 and 38 can be produced individually in consecutive operations or simultaneously in the nozzle 15. During this operation, the material for producing the sealing or damping device 19 is supplied by the extrusion device 17 associated with nozzle 15.

In a third embodiment of the section 2 shown in FIG. 9 the sealing or damping device 19 is not connected to the side face 8 over its whole area and is connected to a further side face 39. The sealing or damping device 19 may be fused to the section 2 over mutually separate support areas 40 and 41.

When producing a section 2 a raw plastics material in granulated form is supplied to the extrusion device 3, in which the material is plasticised by the combined action of pressure and heat. The granulate so mixed and plasticised is fed as a plastics melt to a nozzle 4, in which sections 2 having, for example, the cross-sectional shapes shown in FIGS. 7 to 9 are produced. As soon as the section 2 emerges from the nozzle 4, it is passed through several chambers in order to ensure the adequate dimensional stability of section 2. The section 2 is cooled, either simultaneously or in stages. The cooling process is so arranged that the section 2 has, as it emerges from the cooling and calibrating device 5, a temperature, for example, of less than 70° C., preferably 50° C. Directly after the emergence of the section 2 from the cooling and calibrating device 5, said surface layer 11 is heated by the heating device 9 to the extent that the surface of the layer 11 melts. To this end, said surface layer 11 is heated to a temperature of more than 150° C., preferably between 150° C. and 180° C. The exact temperature to which this plastics is to be heated, not only depends on the plastics materials used, but also on the additives contained therein so that the process temperature cannot be precisely stated in advance. It is, however, essential for the plastic material in the region of the surface layer 11 to be heated to an extent as to melt superficially and, accordingly, bond to, and in particular fuse with, the plastics material fed directly to the heater 9 through the nozzle 15, for producing the sealing or damping device 19. Following nozzle 15, the nozzle opening 18 of which serves to produce the sealing or damping device 19, a take-up device 6 is provided, which is preferably constituted by crawler-type take-ups 7. So as to ensure precise dimensional stability of sealing or damping device 19, the section 2 may be guided between the nozzle 15 and the former 24 vertically and laterally, as can best be seen in FIG. 6.

In order to avoid the destruction or undesirable deformation of the sealing or damping device, if the latter does not cool correctly on its way from nozzle 15 to the take-up device 6, the sealing or damping devices are arranged on side faces of the section 2, which are not contacted by the crawler-type take-ups 7.

If, however the sealing or damping devices 19 must be arranged on a side face which is in fact contacted by the device 6, it is advantageous, if the track plates of crawler-type take-ups 7 are provided with said recesses 26 in order to avoid undesirable deformation of sealing or damping device 19.

FIGS. 10 to 15 show a machine 1 for producing dimensionally stable sections from plastic extrudates, in particular window sections, these generally being hollow sections. The machine 1 comprises an extrusion device 3, downstream thereof a nozzle 4 and a cooling and calibrating device 5. The device 5 is followed by a take-up device 6, for instance with crawler-type take-ups 7. A heater 51 is associated with a side face 8 with side edges 50, of the section 2 in contact with said side face 8. The heater 51 may, as shown in FIG. 12, consist of a hot-air blower 52, by means of which a surface layer 53 of the side face 8 and surface layers 54 of the side edges 50, which are shown diagrammatically, are heated to a doughy or plasticised state. To this end, the surface layers 53 and 54 are heated to a temperature of not less than 150° C. The section 2, having emerged from the cooling and calibrating device 5 directly upstream of heater 51, now has a temperature of less than 70° C. The section 2 has, therefore, cooled down to an extent to be dimensionally stable, there being little likelihood of changes occurring in its outer dimensions. As a result pressure acting unilaterally on the section 2 or heat applied within narrow regions thereof cannot cause the accumulation of undesirable stresses in the section 2 or cause it subsequently to be deformed in an undesirable manner.

A further nozzle 15 is associated in the direction of extrusion, that is to say in the direction of the arrow 14 in FIGS. 10 and 11, with heater 51. The nozzle 15, as best seen in FIGS. 13 and 15, contacts the side faces 8 and side edges 50 of the section 2. This nozzle 15 which is connected to an outlet 16 of a further extrusion device 17, has a nozzle opening 18, the cross-section of which corresponds to a cross-section of the section 2 in the region of the side face 8 and side edges 50. Depending on the width of the opening 18 between the side face 8 and the side edges 50 of the section 2 and the nozzle lips, a protective layer 55 of greater or smaller thickness can be applied to the side face 8 and side edges 50. This protective layer 55 may serve, for example, to ensure abrasion resistance of the surface of the section 2 or its resistance to UV radiation or its colour fastness. Materials 56 for the protective layer 55 may be polyvinyl chlorides (PVC) corresponding to the base material of section 2 or high-grade polyvinyl chlorides. Such high-grade polyvinyl chlorides serve, mainly to refine parts of the section 2 in order to increase its weather resistance, colour fastness and, above all, its resistance to UV radiation. Such protective effects are particularly good if the protective layer 55 consists of an acrylic. Any kind of thermoplastics material for applying such protective layers or devices for sealing, damping or covering, the section may, however, be used.

As further shown in FIGS. 13 and 15, a nozzle body 21 of the nozzle 15 is pressed, by means of a pressure drive 22, against the side face 8 and side edges 50 of the section 2. Also subject to the force exerted by drive 22, the section 2 cannot be displaced since it is supported in a former 23 at the outlet of the cooling and calibrating device 5 and, if required, by a former 24 upstream of the inlet of the take-up device 6, which is arranged downstream thereof. As best seen in FIG. 12, such guiding and supporting action of the formers 23 and 24 is effected both laterally and vertically. In addition, the section 2 is, by virtue of the tensile force exerted by the take-up device 6 and former 23 in the cooling and calibrating device 5, subject to great tension so that, for this reason also, the section 2 can hardly be displaced by the pressure applied by drive 22.

As further shown in FIG. 14, take-up devices 6 or crawler-type take-ups 7 have individual track plates 25 coupled to one another by means of connecting elements 57. Since, when coatings or protective layers 55 of small thickness, are applied, these cool down and cure quickly, they can be loaded immediately after their application, with the track plates 25 without risk of damage to such layers 55.

As also shown in FIG. 15, the heater 51 may consist of a heating element 27, for example an infra-red heating element heated by means of gas or, electric current, for applying sufficient heat to the surface layers 53,54, as indicated diagrammatically by arrows 28, to heat them to a temperature of more than 150° C. at which the plastics material undergoes superficial melting.

For temperature monitoring, in particular for monitoring the temperature of the section 2 before it enters the heater 51, a transducer 29, may be provided, for example, in the region of the former 23 of the cooling and calibrating device 5. Similarly a transducer 30 may be arranged between the heater 51 and the nozzle 15, by means of which the temperature in the region of surface layers 53,54 can be determined. The transducers 29 and 30 may be connected to a control unit 31 which is in turn connected to the heater 51 by way of supply and control lines 58, and with an energy supply system, for example, electric mains or a gas network by way of a line 33.

The transfer of heat to the surface layers 53,54 can thus, as indicated by arrows 28, be regulated as a function of the value measured by the transducer 30, that is to say the temperature in the region of the surface layers 53,54. The values measured by the transducer 29 may however, be incorporated, into the regulating operation so that if the temperature in the section entering heater 51 fluctuates it can be taken into account fully automatically, so that temperature fluctuations in the upper layers 53,54 in the region of the nozzle 15 can be largely avoided. The values measured by the transducer 30 then only serve for monitoring for safety.

Advantageously the side face 8 and side edges 50 of the section 2 are, in the region of surface layers 53, 54 applied only to the protective layer 55 or to the coating and are heated, impairment of the surface quality of the section 2 in the regions adjacent to protective layer 55 being thereby prevented. If it is nevertheless required, and the quality of section 2 would not be impaired, the entire surface of said section 2 may be heated correspondingly.

Figure 16:
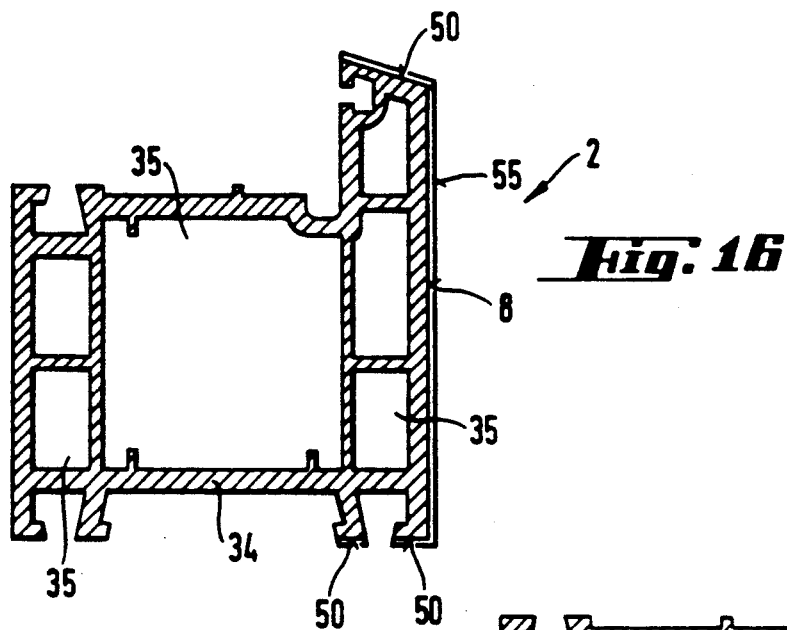
FIG. 16 is an end view of a third embodiment of an extruded plastics section.

FIG. 16 shows a third embodiment of the section 2, which can be produced by the use of a machine according to the invention. As shown in FIG. 16, a hollow section part 34, for example for a window, is provided with several compartments 35. In addition, various surface projections and locking strips are provided for snap connection with other sections. The protective layer 55 is arranged on the side face 8 and on the side edges 50.

Figure 17:
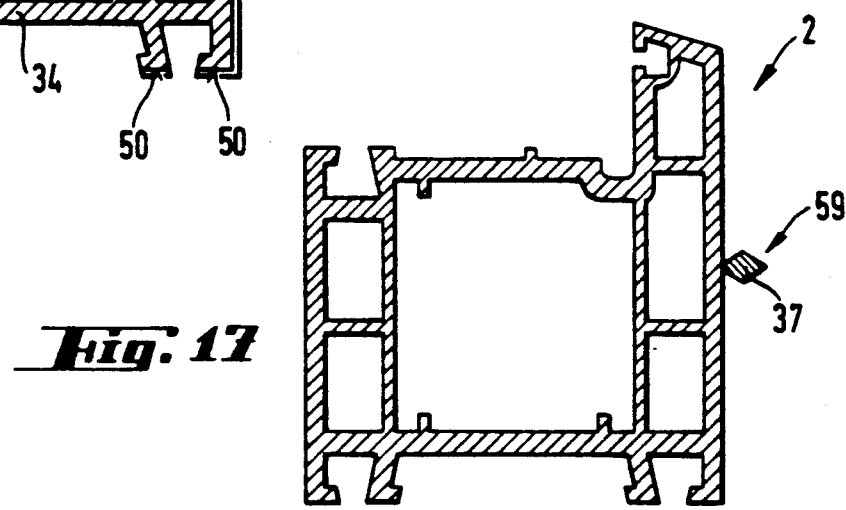
FIG. 17 is an end view of a fourth embodiment of an extruded plastics section.

A fourth embodiment of the section 2, which can be produced by means of the machine shown in FIGS. 10 to 15, is shown in FIG. 17. A device 59 for sealing or damping, for example a sealing lip 37, is arranged on the side face 8 of the section 2. Such sealing lips 37 can be produced independently in consecutive operations or simultaneously with a protective layer 55. Material for producing a device 59 is, during this operation, fed from the extrusion device 17 by way of a further nozzle 15.

Figure 18:
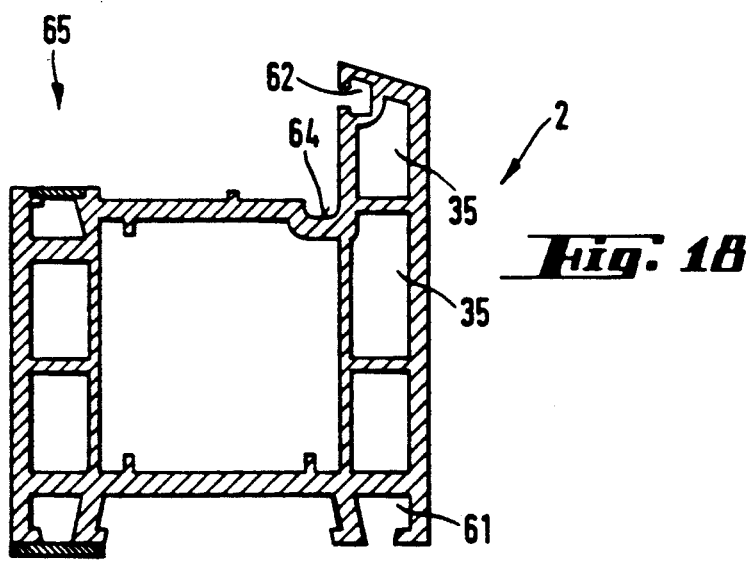
FIG. 18 is an end view of a fifth embodiment of an extruded plastics section.

A fifth embodiment of the section 2 is shown in FIG. 18. A hollow section part 34 comprises several compartments 35, and has on the outer periphery, several groove-shaped recesses 60, 61, 62, 63 and 64. Depending on the type of window to be made from individual sections 2, all or only some of these groove-shaped recesses are required, for example, for inserting sealing lips or glass plates. If some of the recesses 60 to 64, which are redundant in a given application, are in outer regions of the window, they will collect dirt which is difficult to remove therefrom.

It is necessary, however, for precise production of the outer periphery of the recesses 60 to 64 for these to be perfectly calibrated also in said outer regions, in order to ensure adequate dimensional stability for the insertion of sealing devices or glass panes, for example in said recesses.

In order to solve this problem, the offending recesses are closed after calibrating and cooling the section 2, As shown by way of example in FIG. 18, the recesses 60 and 63 are closed by the application of a protective layer 65 or a covering device 66.

Whereas the protective layer 65 is inserted between opposite side edges 67 of the recess 63 and may present only a thin, skin-like cover extending up to the region of outer faces 68, the covering device 66 is sealed by means of a plastic layer 70 extruded on to outer faces 69, of the section 2.

A protective layer 65 or a covering device 66 can be produced in accordance with the process described above for applying a protective layer 55. Nevertheless the production of a layer 65 means for doing this will now be described with reference to FIGS. 19 to 22.

The overall construction of the machine 1 for the production of such protective layers 65 or covering devices 66 corresponds to the machine as shown in FIGS. 10 and 11. The view shown in FIG. 19 corresponds to FIG. 13, the view shown in FIG. 21 corresponding to FIG. 14. The view shown in FIG. 20 corresponds to a view taken on the lines X—X in FIG. 10. FIGS. 19 to 22, however, show parts which are specifically provided for the production of layers 65 and covering devices 66.

Figure 19:
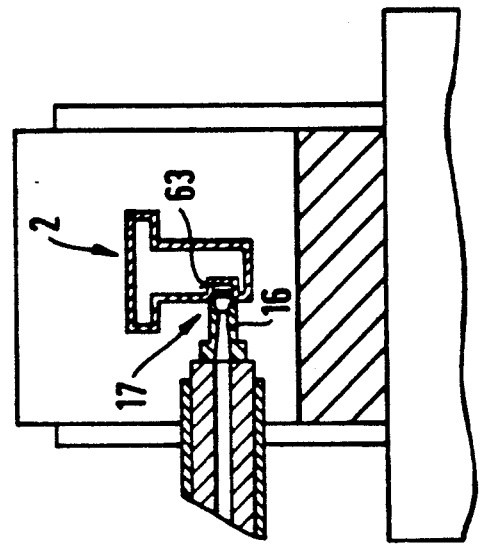
FIG. 19 is a view of a modified form of the machine of FIGS. 10 and 11;, taken on the lines XIII—XIII in FIG. 10 illustrating means for producing the section shown in FIG. 18.

FIG. 19 shows an outlet 16 of an extrusion device 17 extending into the region of the recess 63 of the section 2. Sprues extending in the conveying direction (of the arrow 14) especially a runner 71 shown in FIG. 20 cause accumulation of the melt flow, the cross-section of which corresponds to that of the protective layer 65 of FIG. 18. During application of the protective layer 65, the recess 63 is closed by a part of the die. If the protective layer 65 now emerges from nozzle 15, there is some risk, as it cools further that, before it has hardened adequately, the layer 65 will sink or sag inwardly of the recess 63, thereby adversely affecting the appearance and surface quality of the finished section 2.

As best seen in FIG. 22, a calibrating device 72 following the nozzle 15 or nozzle opening 18, has a plurality of vacuum ducts 73, by means of which the protective layer 65 is aspirated to a guide face 74 of the calibrating device 72. The calibrating device 72 is also provided with cooling ducts 75, through which a cooling medium, for example cold water is passed in order to expedite the cooling of the protective layer 65. The calibrating device 72 and the cooling means therewithin must dissipate sufficient of heat to cool the protective layer 65 to such an extent that after its emergence from the calibrating device 72 no further surface change in the layer 65 can take place.

Figure 21:
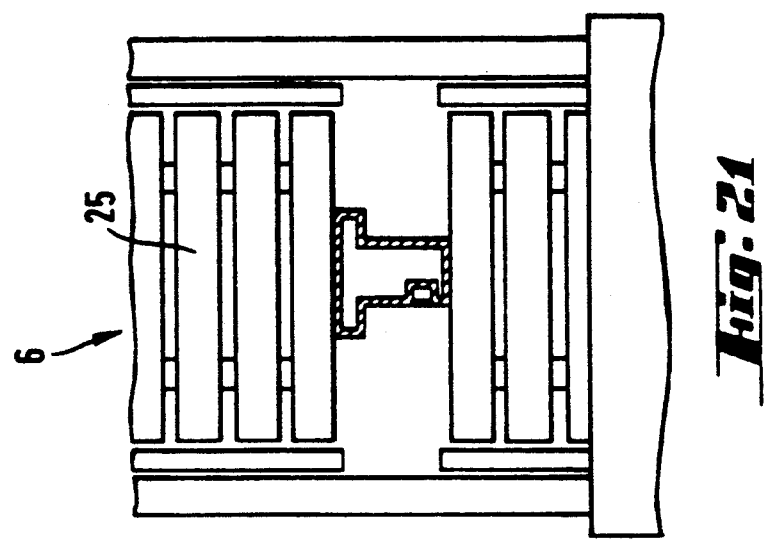
FIG. 21 is a view of said modified machine taken on the lines XIV—XIV of FIG. 10 illustrating further means for producing the section shown in FIG. 18.
Figure 20:
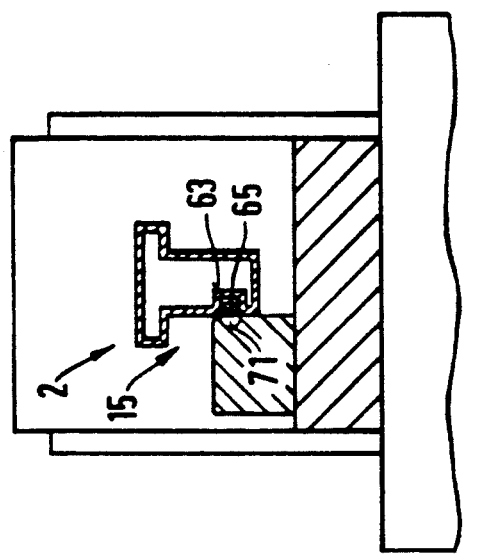
FIG. 20 is a view of said modified machine, taken on the lines X—X in FIG. 10 but illustrating means for producing the section shown in FIG. 18.

In order to avoid the already solidified but not yet fully cured protective layer 65 being disadvantageously affected by the track plates 25 of the takeup device 6, the section 2 is, as best seen in FIG. 21, so conveyed that no track plate 25 of the take-up device 6 contacts that side face of the section 2, in the region of which the protective layer 65 or of the covering device 66 has been applied.

Several dies may be fed simultaneously though an additional extrusion device 17 in order to apply several protective layers 65 or covering devices 66 in one operation.

One advantage of the subsequent application of the protective layer 65 or covering device 66, is that if section 2 is made in advance, the flanks of the recesses 60 to 64 can be produced precisely and in a dimensionally stable way, whereas if such layers are not required, the protective layers 65 and covering devices 66 can be easily broken out or removed, by virtue of the lower adhesion between the material of the protective layers 65 and the covering devices 66 and the basic material of the section 2.

In summary, for producing the section 2, the process is such that a raw plastic in granulated form is fed to the extrusion device 3 and is plasticised and mixed therein by the action of pressure and heat. The plastic granulate so mixed and plasticised is fed as a plastic melt into the nozzle 4 in which the cross-sectional shapes of the sections 2 shown for example in FIGS. 16 to 18 are produced. Immediately after the section 2 has emerged from the nozzle 4, the section 2 is passed through several chambers in order to ensure adequate dimensional stability of the section 2. The section 2 is cooled, simultaneously or consecutively. The cooling process is such that the section 2, has as it emerges from the cooling and calibrating device 5, a temperature of less than 70° C., for example, preferably 50° C. Immediately after the emergence of the section 2 from the cooling and calibrating device 5 the surface layers 53, 54 are heated by means of the heater 51 to such an extent that the surfaces of the layers 53,54 melts. To this end the layers 53,54 are heated to a temperature of more than 150° C., preferably between 150° C. and 180° C. The exact temperature to which this plastics material is to be heated depends not only on the nature of the material but also upon the additives contained in the material so that the exact process temperature cannot be stated in advance. It is, however, essential that the plastics material in the region of the surface layer should be heated to an extent to melt it superficially, so that it is capable of bonding, and in particular of fusing, with the plastics material for the production of the protective layer 55 or of the device 59, which is fed directly to the heater 51 through the nozzle 15. The nozzle 15, through the nozzle opening 18 of which the protective layer 55 or the device 59 is produced, is followed by the take-up device 6, preferably with crawler-type take-ups 7. In order to ensure precise dimensional stability of the protective layer 55 or of the device 59, the section 2 may be guided between the nozzle 15 and the former 24 both vertically and laterally, as best seen in FIG. 15.

In order to avoid the destruction or undesirable deformation of the protective layer 55 or of the device 59, if they do not cool adequately on their way between the nozzle 15 and the take-up device 6, the layer 55 or device 59 are preferably arranged on side faces of the section 2 which are not contacted by crawler-type take-ups 7.

Nevertheless, if the layer 55 or the device 59 must be arranged on such a side face, the track plates 25 of take-ups 7 are provided with recesses in order to avoid undesirable deformation, especially of the sealing lips, of the section 2.

In each case, the section 2 is made throughout of a base material which remains hard and of stable form, that is to say dimensionally stable, when it has finally been cooled, within the required temperature range, that is to say at temperatures for example of between $-30°$ C. and $+80°$ C. The base material for the protective layers 55 and 65 and the covering device 66 which may be formed by plastics layers 70, may consist of polyvinyl chloride (PVC) corresponding to, or resembling, the base material of the section 2, or of a polyvinyl chloride of a higher grade than that base material and may also be such as to be more stable under the action of ultraviolet radiation. Nevertheless, the base material of the protective layers and the covering device may be acryl or any other kind of thermoplastic material.

The modulus of elasticity of the layers 55 and 65 and the device 66 (or layers 70 providing them), which are hard and, therefore, deformation resistant, commonly corresponds to the modulus of elasticity of the section 2.

The modulus of elasticity of the plastics material layers, or the covering layers, or the covering devices, or the protective devices, for closing the recesses 60 to 64, may be lower than the modulus of elasticity of the section 2. In any event, the modulus of elasticity of the material of such layers or devices is preferably such that they are neither plastically or elastically deformable within the temperature range of use of the section 2.

Nevertheless, the modulus of elasticity of said layers or devices for closing the recesses 60 to 64 may be considerably higher than that of the section 2, thereby enabling such devices or layers to be cut out by means of a blade, in order to allow components, for example joints or stop bars to be inserted into the recesses so exposed.

What is claimed is:

1. A process for the production of a dimensionally stable section formed from a plastics extrudate and having a wall provided with a layer produced by extrusion, the process comprising the steps of:

forming said section by extrusion through a nozzle;
   calibrating said section upon its emergence from said nozzle and cooling said section to an extent to render it dimensionally stable;
   heating a surface area of said section wall to bring said surface area to a plastic condition;
   extruding said layer directly onto said heated wall surface area to laminate said layer thereto and to support said layer on said heated wall surface area in continuous contact therewith; and
   gripping said section with said laminated layer by means of a take-up device for removing it.

2. A process as claimed in claim 1, comprising the step of guiding said section both vertically and laterally between said calibrating and cooling steps and said gripping step, said gripping step comprising pulling said section lengthwise by means of said take-up device.

3. A process as claimed in claim 1, wherein said surface area is heated to an extent to melt it.

4. A process as claimed in claim 3, comprising the steps of measuring the temperature of said section prior to said heating step, and heating said surface area in said heating step to an extent determined by such measurement.

5. A process as claimed in claim 1, comprising the steps of measuring the temperature of the material of said heated surface area and controlling the extent to which said area is heated in accordance with such measurement.

6. A process as claimed in claim 1, comprising the steps of measuring the temperature of said surface area before said heating step is carried out, measuring the temperature of said surface area immediately after said heating step and controlling the supply of heat as a function of such temperature measurements.

7. A process as claimed in claim 1, wherein following the calibration thereof said section is cooled to a temperature of less than 70° C., and in said heating step said surface area is heated to at least 150° C., before said layer is extruded onto said surface area.

8. A process as claimed in claim 1, comprising the step of fusing a plasticised melt for the formation of said layer with said heated surface area.

9. A process as claimed in claim 1, comprising the step of guiding said section both prior to and after the application of said layer to said heated surface area.

10. A process as claimed in claim 1, wherein said section is gripped by said take-up device at a position adjacent to said layer.

11. A process as claimed in claim 1, comprising the further step of cooling said layer proximate to said take-up device.

12. A process as claimed in claim 1, wherein said layer is applied as a protective layer to two opposite side edges of a recess in said section.

13. A process as claimed in claim 12, wherein said protective layer extends beyond said opposite edges.

14. A process as claimed in claim 1, wherein said layer is applied as a cover to two outer faces of said section to span a recess therein.

15. A process as claimed in claim 1, wherein said layer is an elastically deformable layer having a higher modulus of elasticity than said section.

16. A process as claimed in claim 15, wherein said layer is a sealing device.

17. A process as claimed in claim 1, wherein said layer is a hard protective layer.

* * * * *